United States Patent
Asai et al.

(10) Patent No.: US 6,554,110 B2
(45) Date of Patent: *Apr. 29, 2003

(54) DRUM BRAKE DEVICE

(75) Inventors: Seiji Asai, Okazaki (JP); Takashi Ikeda, Owariasahi (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/025,997

(22) Filed: Dec. 26, 2001

(65) Prior Publication Data
US 2002/0092714 A1 Jul. 18, 2002

(30) Foreign Application Priority Data
Dec. 22, 2000 (JP) ........................................ 2000-390390

(51) Int. Cl.[7] .............................................. F16D 51/22
(52) U.S. Cl. .......................................... 188/78; 188/328
(58) Field of Search ................................ 188/78, 79.51, 188/79.54, 106 A, 325, 328, 335

(56) References Cited

U.S. PATENT DOCUMENTS

| | | | | |
|---|---|---|---|---|
| 5,070,968 A | * | 12/1991 | Evans | 188/79.64 |
| 5,819,887 A | * | 10/1998 | Asai et al. | 188/78 |
| 6,003,645 A | * | 12/1999 | Asai et al. | 188/328 |
| 6,065,571 A | * | 5/2000 | Ikeda | 188/79.61 |
| 6,302,245 B1 | * | 10/2001 | Ikeda | 188/79.51 |

* cited by examiner

Primary Examiner—Christopher P. Schwartz
(74) Attorney, Agent, or Firm—Apex Juris, pllc; Tracy M. Heims

(57) ABSTRACT

A drum brake device having a brake lever with sufficient rigidity, and securing a larger space at a central region of a brake, to provide a large effective brake lever stroke. A by-pass hole 60d, which is freely penetrated by a shoe-hold pin 41 which swingably rises from the back plate is formed in the brake lever 60 positioned beneath the shoe web 20b of the brake shoe 20, and a section of the brake lever 60, surrounding the by-pass hole 60d, is formed in a hollow cavity 60e by drawing or in a groove 60f by bending to be positioned closer to and facing toward the back plate 10.

3 Claims, 6 Drawing Sheets

DRUM BRAKE DEVICE

FIELD OF THE INVENTION

This invention relates to a drum brake device with a mechanical type actuator and especially relates to a structure wherein a larger space is reserved at a central region of the brake so as to extend an effective stroke range of the mechanical type actuator.

DESCRIPTION OF RELATED ART

An example of a drum brake device with a mechanical type actuator is disclosed in Publication Number JP09273573, which is hereby incorporated by reference. The structure and action of this type of drum brake device is disclosed well in JP09273573. Therefore, an explanation here will be limited to a general description as to an overall structure and braking action of the drum brake device with reference to FIGS. 1–3 of this invention employing the same basic structure as in JP09273573. Terms such as "upper" and "lower" or "left" and "right" used herein are explained with reference to FIG. 1. A back plate 10 is a disc-shape as a whole. An axle (not shown in the figures) penetrates into a central hole 10a formed in the center of the back plate 10, and four installation holes 10b are formed around the central hole 10a into which fixing members are inserted to fix the back plate 10 on a stationary part of a vehicle (not shown in the figures). A pair of brake shoes 20, 30 comprise almost arc-shaped shoe rims 20a, 30a, shoe webs 20, 30 fixed on inner circumferential surfaces of the shoe rims 20a, 30a designed to make T-shapes when viewed cross-sectionally, and linings 20c, 30c affixed on outer circumferential surfaces of the shoe rims 20a, 30a. One side surface of the shoe rims 20a, 30a is movably put on the back plate 10. A wheel cylinder 11 of a hydraulic type actuator positioned between upper adjacent ends of the brake shoes 20b, 30b is fixed on the back plate 10 by bolts, and a pair of pistons 11a (one in the right side only in FIG. 1) make slight contact with the upper end surfaces of the shoe webs 20b, 30b. Lower ends of the shoe webs 20b, 30b are supported by an anchor 10c fixed on the back plate 10 by a fixing means, such as rivets. A pair of shoe-hold mechanisms 40, 50 comprises shoe-hold pins 41, 51 and shoe-hold springs 42, 52 (see FIG. 6).

Top ends of the shoe-hold pins 41, 51 swingably engage the back plate 10 and retain the shoe-hold springs 42, 52, positioned on shoe webs 20b, 30b so as to contract the same to form almost a U-shape, thereby urging the brake shoes 20, 30 toward the back plate 10. Due to the above configuration, surfaces of the linings 20c, 30c are constantly parallelized, within a certain clearance, to an inner circumferential surface of a brake drum (not shown in the figures). Details of the shoe-hold mechanism 40 at the left side of the figures will be explained later. A first strut 12 adjacent to the wheel cylinder 11 has a screw mechanism and is extended between both shoe webs 20b, 30b. Extending or shortening the first strut 12 adjusts the clearance between the linings 20c, 30c and the brake drum (not shown in the figures). A pair of upper and lower shoe-return springs 15, 16 urging the pair of brake shoes 20, 30 to approach each other are stretched between both shoe webs 20b, 30b. This prevents dragging of the linings 20c, 30c when releasing the brake. The structure of the mechanical type brake mechanism will be explained next.

A brake lever 60 superposed on the shoe web 20b of the left brake shoe 20, positioned between the back plate 10 and the shoe web 20b, but adjacent to the shoe web 20b, has a base portion 60a pivotally supported at a lower end portion of the shoe web 20b by a pin 61. A free end 60b of the brake lever 60 is connected to a cable end 62a of a brake cable 62 functioning as a remote force transmitting member, and a projection 60c formed on an outer circumferential edge of the brake lever 60 near the free end 60b, just like shown in FIG. 1, abuts against an inner circumferential surface of the shoe rim 20a, thereby restricting a returning position of the brake lever 60. A cable guide 10d is fixed on the back plate 10 to smoothly guide the brake cable 62, and a guide pipe 10e fixes one end of an outer casing.

The outer casing is a member to protect the brake cable 62 that may be directly exposed to outside air.

A pivot lever 14 superposed on the shoe web 30b of the right brake shoe 30, positioned between the back plate 10 and the shoe web 30b of the brake shoe 30, has a centrally located protuberance 14a pivotally supported at the central location of the shoe web 30b. A second strut 13 is extended between a lower end of the pivot lever 14 and the lower portion of the brake lever 60, and the upper end of the pivot lever 14 engages with a right end portion of the strut 12.

Details of the shoe-hold mechanism 40 at the left side of FIG. 6 will be explained with reference to the FIG. 6.

One end of which has a head 41b wherein the head declines or slopes to meet the stem of the shoe-hold pin in order to allow the pin to swingably move, the other end of which has an enlarged head 41c in order to fix the shoe-hold spring 42. The head 41b at one end of the shoe-hold pin 41 swingably engages with an engagement hole 10f formed in the back plate 10, and the head 41c at the other end of the shoe-hold pin 41 penetrates through a by-pass hole 20d formed in the shoe web 20b and a by-pass hole 42b formed in the bottom branch 42a of the shoe-hold spring 42, wherein a top branch 42c of the shoe-hold spring 42 facing the bottom branch 42a of the shoe-hold spring 42 is fixed by the shoe-hold pin 41. As such, the brake shoe 20 is resiliently supported on the back plate 10.

In order to keep a larger space at a central region of the brake, the brake lever 60 is positioned such that its outer circumferential edge is adjacent to the stem 41a of the shoe-hold pin 41.

An explanation as to an automatic shoe clearance adjustment mechanism automatically adjusting a clearance between the linings 20c, 30c and the brake drum (not shown in the figures) and an automatic stroke adjustment mechanism automatically adjusting a stroke of the brake lever 60 according to the lining wear of the linings 20c, 30c is omitted since it is not directly related to the concept of this invention.

In addition, the automatic stroke adjustment mechanism is configured in the second strut 13, and an explanation as to its structure and action is disclosed in Publication Number JP10110758 which is hereby incorporated by reference. Braking action of the brake device with the above-structure will be explained with reference to FIG. 1.

A hydraulic actuator action will be explained first.

If a wheel cylinder 11 is pressurized to push both pistons (where only right half of the wheel cylinder 11 with a piston 11a is shown in FIG. 1), the brake shoes 20, 30 move outward with a point of abutment with the anchor 10c as a pivot point, and the linings 20c, 30c frictionally engage with the brake drum (not shown in FIG. 1).

Either brake shoe 20 or brake shoe 30, where the brake drum moves in a rotational direction about the brake shoe, functions as a leading shoe, and the remaining brake shoe of the two positioned not in a rotational direction functions as a trailing shoe, thereby operating and functioning as a leading trailing type drum brake device with a stable braking effect.

A mechanical type actuator action will be explained next. If the free end 60b of the brake lever 60 is pulled via a brake cable 62, the brake lever 60 rotates clockwise with the pin 61 as a pivot point, and the operation force is transmitted to the second strut 13, the pivot lever 14, and the first strut 12 respectively so as to move the left brake shoe 20 outward to cause a frictional engagement with the brake drum.

Simultaneously, the right brake shoe 30 moves outward via the protuberance 14a of the pivot lever 14 to cause a frictional engagement with the brake drum.

An outward force acts on the lower end of the left brake shoe 20 via the pin 61.

A frictional force of either the brake shoe 20 or the brake shoe 30 working as a primary shoe in relation to a rotational direction of the brake drum is transmitted to the remaining brake shoe of the two working as a secondary shoe via the first strut 12 so as to cause a braking force, thereby functioning as a duo servo type drum brake device with a highly effective braking force. Accordingly, this drum brake device is defined to be a dual mode type drum brake device.

A conventional drum brake device has the following drawbacks: Recently, for safety reasons, the number of vehicles utilizing anti-lock brake control devices, has been increasing.

For a vehicle with the anti-lock brake control device, a sensor wheel rotating together with the brake drum is positioned at the central region of the brake, and a sensor faces an outer circumferential surface of the sensor wheel with a certain clearance. A body of the sensor penetrates through a through hole 10g (see FIG. 1) formed in the back plate 10 to be installed. Accordingly, unless a sufficiently effective brake lever stroke is reserved, the sensor may be damaged.

In a four-wheel drive vehicle, because a hub portion of the brake drum is positioned at the central region of the brake, an insufficient effective brake lever stroke, just like the above case, may damage the hub portion and the brake lever. If the hub portion of the brake drum is positioned at the central region of the brake, and in order to avoid any interference with the same, pitches of the installation holes on the back plate become wider requiring a sufficient space necessary for installing fixing members. Considering the above drawbacks, it is desirable to keep a larger space at the central region of the brake. For example, U.S. Pat. No. 3,255,849 and Publication Number JP58052342U disclose the structure employing a means to keep a larger space at the central region of the brake.

In the configuration of this invention, the shoe-hole pin rises from the back plate and passes or penetrates through the by-pass hole. The flat brake lever plate is positioned beneath the shoe web and parallel to the back plate with a certain clearance, and the outer circumferential edge of the brake lever approaches the inner circumferential surface of the shoe rim.

The brake lever disclosed in the drawings of U.S. Pat. No. 3,255,849 only suggest a by pass hole on a member adjacent to a shoe web, from which a shoe-hold pin is freely penetrated through.

However, the structure of this conventional drum brake device has the following drawbacks:

The shoe-hold pin has a semi-sphere head at one end of which is swingably engaged with a back plate. Therefore, there is no guarantee of maintaining a stable condition.

As the lining wears, the shoe-hold pin leans towards the outside of the brake because of the sloped surface of the head. When the brake lever is in operation, if collision of the brake lever collides and the shoe-hold pin cause a serious damage to both. Therefore, in order to satisfy the above requirements, the by-pass hole of the brake lever must be designed to be of sufficient size. As such, an inner circumferential line of the brake lever at the brake center side is necessarily projected resulting in diminishing the space at the central region of the brake.

A large by-pass hole needs to be formed in the flat brake lever, which reduces the strength of the brake lever. Because of this larger hole, a section of the brake lever surrounding the by-pass hole needs to be wider, which also contributes to the diminished space at the central region of the brake. A reinforcement plate may be added to increase the strength of the brake lever, but adding an additional member automatically increases the total weigh and makes the assembly more complex. This invention was made to remove the aforementioned drawbacks, and the object or purpose of this invention is to achieve a long, effective brake lever stroke by way of ensuring a larger space in the brake and to provide a drum brake device with a high rigidity brake lever.

SUMMARY OF THE INVENTION

This invention is a drum brake device comprising a brake shoe being movably disposed parallel to a surface on a fixed back plate, a parking brake actuating lever superposed on a shoe web of the brake shoe, positioned between the back plate and the shoe web, but adjacent to the shoe web, a base end of which is pivotally supported at one end of the shoe web, a shoe-hold pin, one end of which swingably engages with the back plate while the other end freely penetrates a by-pass hole formed in the parking brake actuating lever. A shoe-hold spring is retained by the other end of the shoe-hold pin so as to urge the brake shoe toward the back plate. The brake shoe frictionally engages with she brake drum upon pulling a free end of the brake lever by a remote force transmitting member, and a part of the parking brake actuating lever surrounding the by-pass hole is positioned closer to and is facing the back plate.

This invention also is the drum brake device as above, wherein a part of the brake lever, surrounding the by-pass hole, is drawn to form a hollow cavity or is bent to form a groove.

BRIEF DESCRIPTION OF THE DRAWINGS

The above and other objects and advantages of the present invention will become readily apparent by reference to the following detailed description when considered in conjunction with the accompanying drawings.

DETAILED DESCRIPTION OF THE EMBODIMENT

An example of a drum brake device utilizing this invention is explained below with reference to the accompanied drawings. For the purpose of explanation, the same reference numbers as in the aforementioned conventional art shown in FIGS. 1–3 will be assigned to identical parts or sites having the same functions as described in the following example. Furthermore, the explanation of the components and the brake action are omitted.

Figure 1:
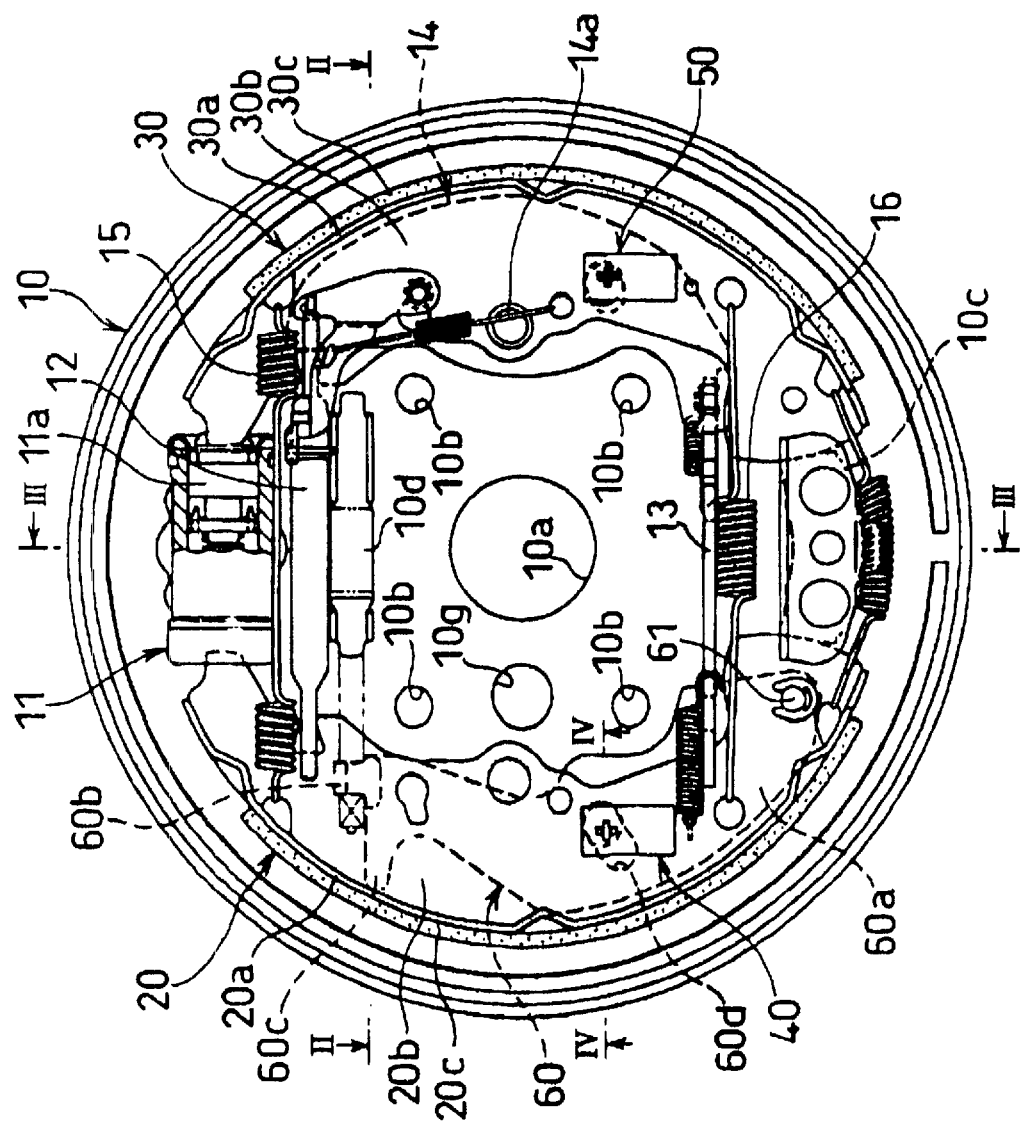
FIG. 1 is a plan view of a drum brake device as to Example 1 of this invention.
Figure 2:
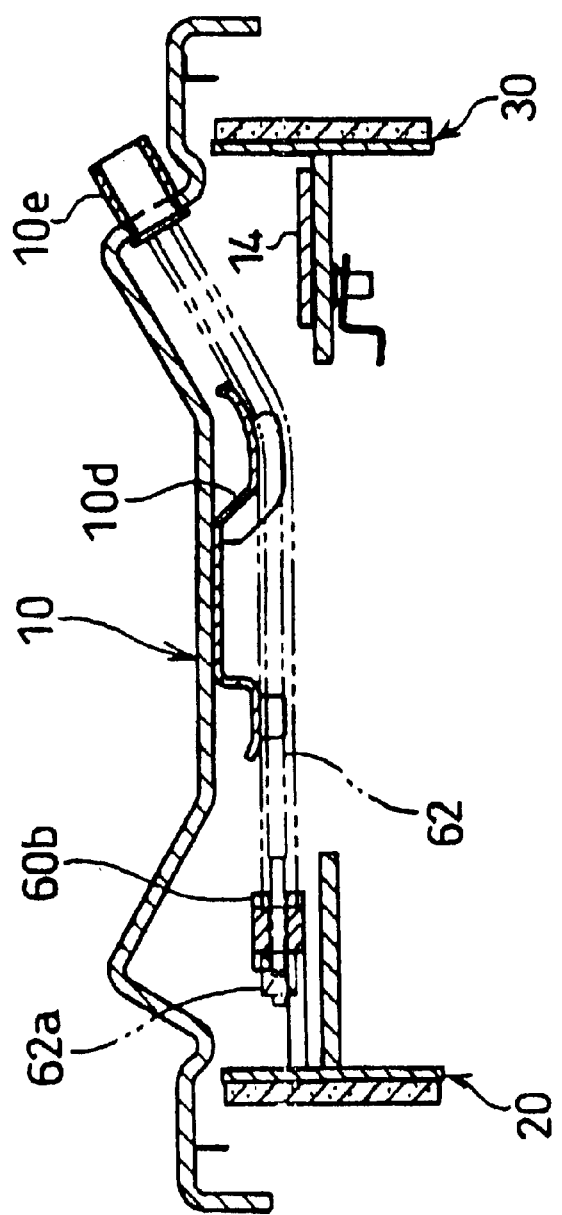
FIG. 2 is a cross-section view of FIG. 1 taken along the line II—II.
Figure 3:
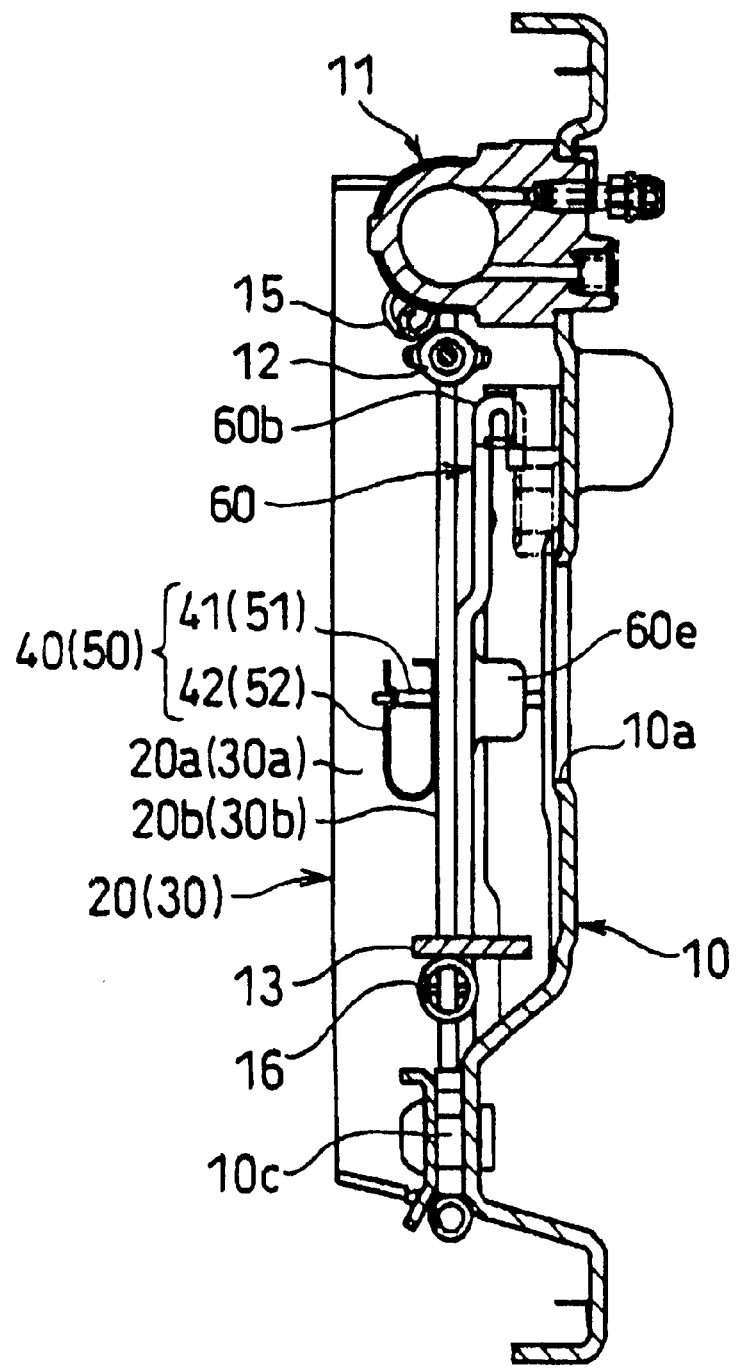
FIG. 3 is a cross-section view of FIG. 1 taken along the line III—III.
Figure 4:
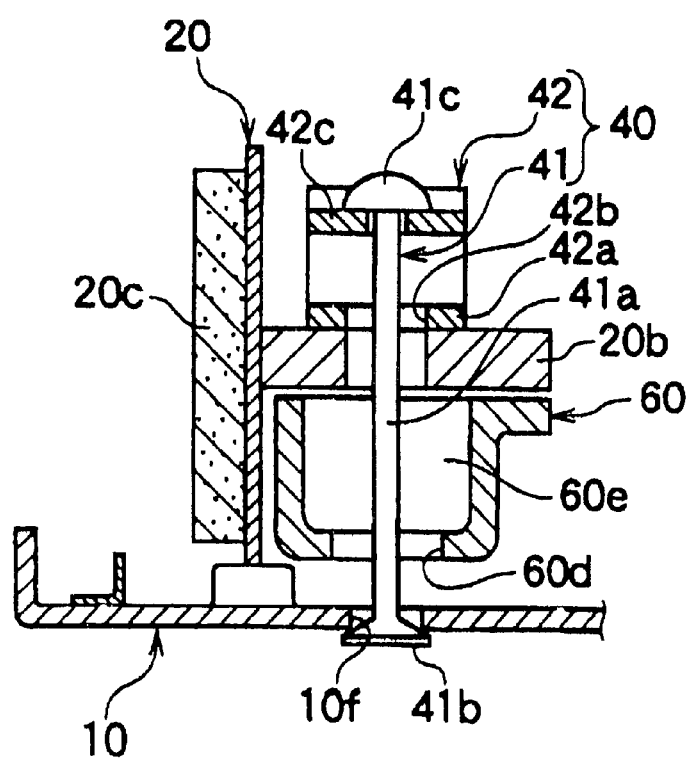
FIG. 4 is a cross-section view of FIG. 1 taken along the line IV—IV.

Example 1 of this invention will be explained with reference to FIG. 4 in addition to FIGS. 1 and 3.

Only the shape of the brake lever 60 is different from the above-described conventional art. Therefore, the same reference numbers therein will be assigned to identical parts or sites having the same functions as described in the conventional art and the explanation of which will be omitted here.

A by-pass hole 60d is formed in the mid-portion of the brake lever 60 and a stem 41a of a shoe-hold pin 41 penetrates through the by-pass hole 60d, and a part surrounding the by-pass hole 60d is drawn by press to be shaped into a hollow cavity 60e, and a bottom portion of the cavity 60e is positioned closer to and is facing towards the back plate 10. For example, if a shoe-hold pin 41 is installed at an inclined angle, or if an angle of the shoe-hold pin 41 becomes larger due to lining wear, the amount of variation in the clearance between the shoe-hold pin 41 and an inner surface of the by-pass hole 60d of the brake lever 60 is quite small.

Figure 5:
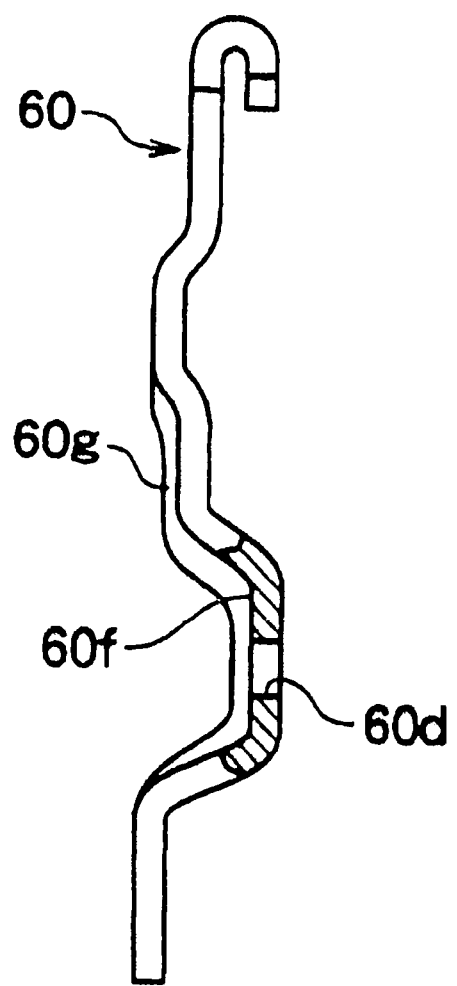
FIG. 5 is a plan view of a brake lever as to Example 2 of this invention.

Accordingly, there is no need to account for the amount of clearance variation when establishing the size of the by-pass hole 60d, thereby allowing a narrower overall width around this area. As a result, a larger space at the central region of the brake is permitted, and at the same time a large effective stroke of brake lever 60 may be allowed, thereby preventing any interference with an anti-lock sensor and a brake drum hub. Also, the cavity 60e is box-shaped which increases the rigidity. Example 2 will be explained with reference to FIG. 5. Example 2 is almost identical to the brake lever 60 of Example 1 except for the shape of its by-pass hole 60d. Therefore, the rest of the explanation is omitted.

The section around by-pass hole 60d is designed to be bent in a shape in accordance with a groove 60f so as to approach and face the back plate 10, and a rib 60g with a predetermined width and height along a plate surface of the groove 60f is integrally formed therewith. However, the rib 60g is not a prerequisite of this invention and is provided as necessary.

The groove 60f is proven to provide about the same advantages as the 60e, and an explanation of which will be omitted. The above examples are described in relation to an application in a dual mode type drum brake device; however, applications of this invention is not limited to the dual mode type but for example a publicly known leading trailing type drum brake, duo servo type drum brake device or a drum brake device with a single shoe as shown in Publication Number JP09324829.

Because of the above-described structure, the drum brake device of this invention has the following advantages. The shoe-hold pin rises from the back plate and freely penetrates through the by-pass hole. The by-pass hole is formed in the brake lever plate that is superposed on the shoe web and positioned between the back plate and the shoe web and the outer 3 circumferential edge of the brake lever may be designed to approach the inner circumferential surface of the shoe rim.

Because the part of the brake lever around the by-pass hole is positioned closer to and is facing the back plate, when the shoe-hold pin is installed at an incline at an engagement point with the back plate as the pivot point or when an angle of the shoe-hold pin becomes larger due to the lining wear, the amount of variation in the clearance between the shoe-hold pin 41 and an inner surface of the by-pass hole of the brake lever is quite small. As a result, the size of the by-pass hole may be designed without considering the amount of variation, and the width of the brake lever around this area may be narrower, thereby securing a larger space at the central region of the brake. Therefore, the large effective stroke of the brake lever is realized, which may prevent damage to the anti-lock sensor and may not interfere with the brake drum hub.

Because the space at the central region of the brake is larger, assembly of the brake device on the vehicle is facilitated.

The part of the brake lever around the by-pass hole may be integrally formed in a hollow drawn by press or integrally formed in a groove with a rib. Therefore, the rigidity is maintained even if the width of the brake lever around the by-pass hole may be a bit narrower, and the assembling process is made easier.

This invention can be applied to various types of drum brakes employing a dual mode type, leading trailing type, duo servo type, and a type of a drum brake with single brake shoe and provides a wide range of applicability.

It is readily apparent that the above-described invention has the advantages of wide commercial utility. It may be understood that the specific form of the invention hereinabove described is intended to be representative only, and certain modifications within the scope of these teachings will be apparent to those skilled in the art without departing from the spirit and scope of the invention.

Accordingly, reference should be made to the following claims in determining the full scope of the invention.

What we claim is:

1. A drum brake device comprising a brake shoe being movably disposed parallel to a surface on a fixed back plate, a parking brake actuating lever superposed on a shoe web of the brake shoe, positioned between the back plate and the shoe web, but adjacent to the shoe web, a base end of which is pivotally supported at one end of the shoe web, a shoe-hold pin, one end of which is swingably engages with the back plate while the end of which freely penetrates a by-pass hole passing through the parking brake actuating lever, and a shoe-hold spring retained by the other end of the shoe-hold pin so as to urge the brake shoe toward the back plate, wherein the brake shoe frictionally engages with the brake drum upon pulling a free end of the parking brake actuating lever by a remote force transmitting member, and wherein a part of the parking brake actuating lever surrounding the by-pass hole is positioned closer to and is facing the back plate.

2. The drum brake device as claimed in claim 1, wherein a part of the brake lever, surrounding the by-pass hole, is drawn to form a hollow cavity.

3. The drum brake device as claimed in claim 1, wherein a part of the brake lever, surrounding the by-pass hole, is bent to form a groove.

* * * * *

UNITED STATES PATENT AND TRADEMARK OFFICE
CERTIFICATE OF CORRECTION

PATENT NO.    : 6,554,110 B2
DATED         : April 29, 2003
INVENTOR(S)   : Seiji Asai and Takashi Ikeda It is certified that error appears in the above-identified patent and that said Letters Patent is hereby corrected as shown below:

Column 1,
Lines 35-37, should read -- A wheel cylinder 11 of a hydraulic type actuator positioned between upper adjacent ends of the brake shoes 20, 30 is fixed on the back plate 10 by bolts, and a pair of pistons --.

Column 5,
Lines 47-49, should read -- The groove 60f is proven about the same advantages as the cavity 60e and an explanation of which will be omitted. --.

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

Figure 6:
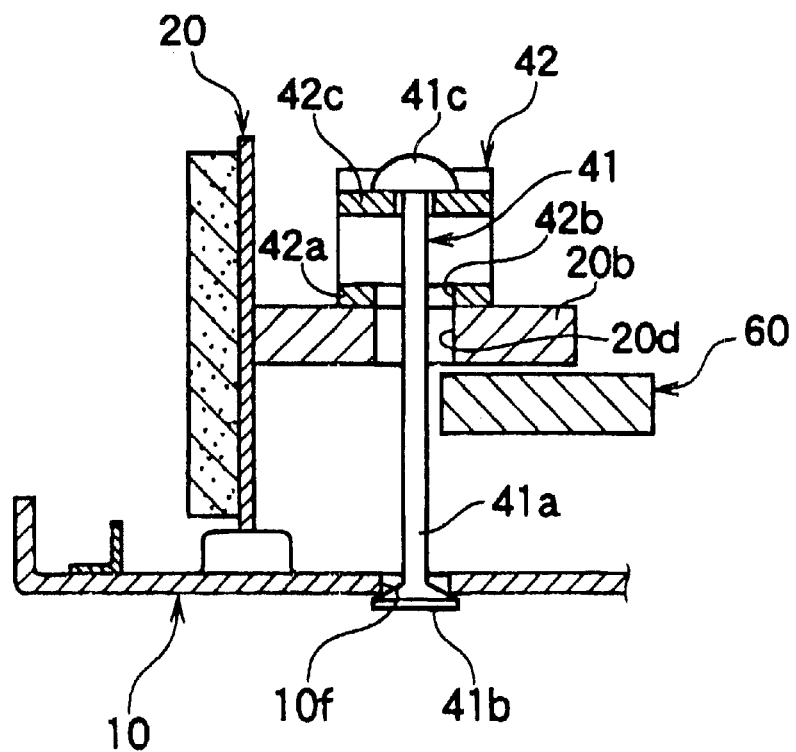
FIG. 6 is a cross-section view of a shoe-hold mechanism of the prior art.

PATENT NO. : 6,554,110 B2  Page 1 of 1
APPLICATION NO. : 10/025997
DATED : April 29, 2003
INVENTOR(S) : Seiji Asai and Takashi Ikeda It is certified that error appears in the above-identified patent and that said Letters Patent is hereby corrected as shown below:

column 2, line 23 through 24 should read:
--Details of the shoe-hold mechanism 40 at the left side of FIG. 1 will be explained with reference to the FIG. 6.

column 4, line 24 through line 40 should read:
--This invention is a drum brake device comprising a brake shoe being movably disposed parallel to a surface on a fixed back plate, a parking brake actuating lever superposed on a shoe web of the brake shoe, positioned between the back plate and the shoe web, but adjacent to the shoe web, a base end of which is pivotally supported at one end of the shoe web, a shoe-hold pin, one end of which swingably engages with the back plate while the other end freely penetrates a by-pass hole formed in the parking brake actuating lever. A shoe-hold spring is retained by the other end of the shoe-hold pin so as to urge the brake shoe toward the back plate. The brake shoe frictionally engages with the brake drum upon pulling a free end of the parking brake actuating lever by a remote force transmitting member, and a part of the parking brake actuating lever surrounding the by-pass hole is positioned closer to and is facing the back plate.--.

Signed and Sealed this

Eighth Day of August, 2006

JON W. DUDAS
*Director of the United States Patent and Trademark Office*